United States Patent

[11] 3,599,696

| [72] | Inventor | John J. Hartz |
| | | Akron, Ohio |
| [21] | Appl. No. | 797,475 |
| [22] | Filed | Feb. 7, 1969 |
| [45] | Patented | Aug. 17, 1971 |
| [73] | Assignee | The Goodyear Tire & Rubber Company |
| | | Akron, Ohio |

[54] PNEUMATIC TIRE
28 Claims, 1 Drawing Fig.

| [52] | U.S. Cl. | 152/361 |
| [51] | Int. Cl. | B60c 9/12 |
| [50] | Field of Search | 152/361, 209 |

[56] References Cited
UNITED STATES PATENTS

| 3,225,812 | 12/1965 | Barrett | 152/361 |
| 3,433,689 | 3/1969 | Marzoochi et al. | 152/361 |
| 3,506,052 | 4/1970 | Wittneben | 152/361 |
| 3,512,568 | 5/1970 | Delobelle | 152/361 |

*Primary Examiner*—James B. Marbert
*Attorneys*—F. W. Brunner and M. William Goodwin ABSTRACT: A bias-belted pneumatic tire, in particular one with a polyester cord carcass and a fiberglass belt, in which there is provided over the belt a layer of randomly oriented, discrete filaments, preferably wire, which are embedded in low hysteresis rubber. The filamentary layer is superposed at least substantially directly over the belt and is at least as wide as the belt.

PATENTED AUG 17 1971
3,599,696
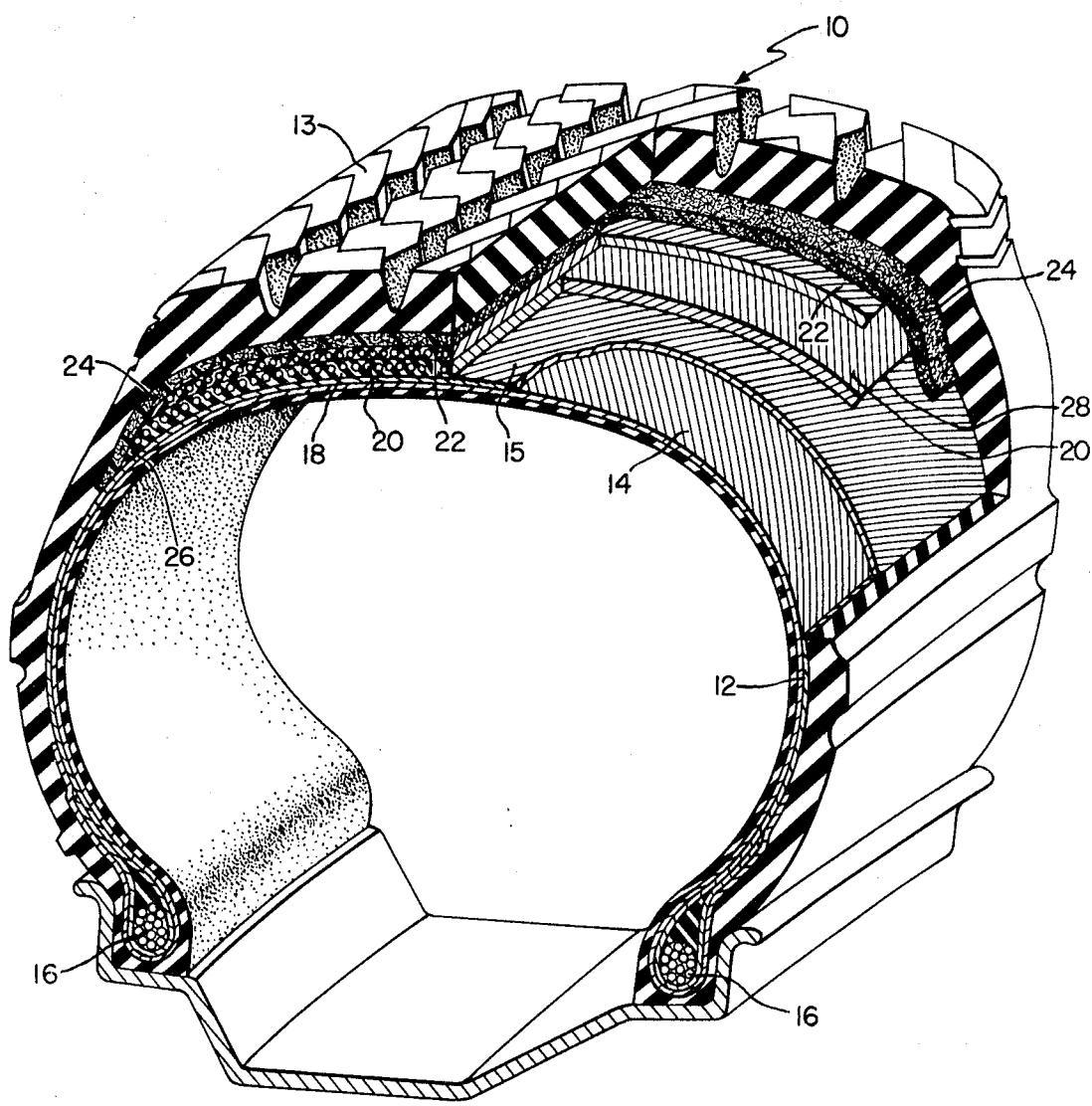
INVENTOR
JOHN J. HARTZ
BY M William Jackson
ATTORNEY

PNEUMATIC TIRE

The foregoing abstract is not to be taken as limiting the invention of this application, and in order to understand the full nature and extent of the technical disclosure of this application, reference must be made to the accompanying drawing and the following detailed description.

This invention relates to pneumatic tires, and finds particular utility in connection with bias-belted tires intended for use on passenger vehicles.

It is the object of the present invention to provide belted tires and particularly bias-belted tires of novel and improved construction which will have lower operating temperatures particularly in the shoulder region of the tire, which will have improved strength in the belt region of the tire, which will have improved bruise resistance particularly as regards the belt region of the tire, which will have improved belt edge separation resistance, which will have increased tread stiffness tending to improve the wearing quality of the tread, and which will have improved resistance to cutting and cut growth.

Other objects will be in part obvious, and in part pointed out more in detail hereinafter.

The drawing is a fragmentary, cross-sectional, perspective view of a bias-belted tire incorporating the present invention.

With reference to the drawing, a pneumatic tire incorporating the present invention is generally indicated at 10 and comprises a carcass 12 and a tread 13 disposed over and extending circumferentially about the carcass 12. The carcass 12 comprises a plurality of reinforcing plies of cord-reinforced rubber commonly referred to as tire cord fabric. In the specific embodiment shown in the drawing two such plies 14, 15 are utilized, and the cords reinforcing the plies are fabricated from continuous filament polyester. While polyester tire cord fabric is preferred and offers decided advantages as a carcass ply cord material, it is within the scope of the present invention to utilize other materials for the reinforcing cord of the carcass plies. Such other materials might be nylon, rayon, fiberglass, metal, or any other material or combination of materials the use of which is found to be feasible for the reinforcement of carcass plies of tires. In the particular embodiment shown, the carcass plies 14, 15 each extend continuously between a pair of spaced-apart beads 16, each of which is generally circular and comprises a plurality of turns of inextensible wire. The carcass plies 14, 15 are folded around the beads so as to anchor the plies with respect to the beads. While a two-ply carcass construction as shown in the drawing is preferred, any other suitable number of carcass plies may be utilized if desired.

The reinforcing cords of the carcass plies 14, 15 extend generally parallel with each other within each ply and at a predetermined angle to the midcircumferential centerplane of the tire. By the midcircumferential centerplane of the tire is meant the plane extending at right angles to the axis of rotation of the tire and passing through the circumferential centerline of the ground-contacting portion of the tread 13 of the tire. By the ground-contacting portion of the tread is meant that portion of the tread which normally contacts the ground when the tire is mounted on a rim, inflated within its normal operating pressure range, mounted on a vehicle and loaded within the normal load range of the tire and while the vehicle is stationary. The angle that the cords of the carcass ply describe with and at the midcircumferential centerplane of the tire is referred to as the "cord angle."

Where the carcass 12 is a bias-ply carcass, the cord angle of each of the carcass plies is no more than 55° and is preferably within the range of 30° to 40°, and the cord angle of each of the carcass plies is equal to that of the other carcass ply but of opposite sign. It is to be understood that that the term "bias" as used herein refers to the fact that the cord angle of the carcass plies is no more than 55° as opposed to so-called radial tires in which the cord angle of the carcass cords is substantially greater than 55°; for example, 75° to 90°. Thus, the use herein of the term bias is not to be confused with other uses of the term in connection with radial carcass tires merely to indicate that the carcass cords extend at an angle to the midcircumferential centerplane of the tire.

Disposed over the crown of the carcass 12 and between the carcass and the tread 13 is a belt 18 which extends circumferentially entirely about the carcass. The belt of a tire of the present invention is not to be confused with a breaker as used in certain bias carcass tires. A breaker conventionally comprises one or more plies of cord-reinforced rubber laid over the crown of the carcass and has a cord angle not significantly different from and often essentially the same as, the cord angle of the carcass plies. Like a belt, a breaker is not anchored to the beads of the tire, but rather its edges are disposed adjacent the shoulder regions of the tire. A principal characterizing difference between a bias carcass tire with a breaker and the belt of a belted tire is that the belt, unlike the breaker, restrains the carcass when the tire is inflated. For example, when a bias-belted tire is inflated, the belt prevents the carcass from achieving the outer diameter at the midcircumferential centerplane of the tire that it would normally achieve were the belt not present, and the difference in these diameters is substantial. This restraint of the bias carcass by the belt is in part responsible for the greatly improved performance of a bias-belted tire. Also, the belt of a bias-belted tire has a cord angle which unlike a conventional breaker, is significantly less than the cord angle of the carcass plies. Additionally, the carcass of a belted tire is cured with an outside diameter at the midcircumferential centerplane which is substantially less than the diameter the carcass would normally assume when inflated and unrestrained by the belt. It will thus be apparent that there are very distinct structural and operational differences between a belt of a belted tire contemplated by this invention and a breaker as associated with a conventional bias angle carcass tire, as well as between the carcass belt relationship of a bias carcass breaker tire and, for example, a bias-belted tire.

The belt 18 is of multi-ply construction and in the specific embodiment shown, there are only two belt plies 20, 22. However, a different number of belt plies may be utilized, if desired. Each of the belt plies is manufactured from tire cord fabric, or in other words a plurality of parallel reinforcing cords embedded in a matrix of rubber. Where the term rubber is used herein, it is to be understood that this term is being used to indicate any material or compound whether synthetic or natural in origin, and combinations of the same, which are suitable for use in a tire for the purpose intended.

The cords of the belt plies have a cord angle substantially less than the cord angle of the carcass plies. For example, where the carcass ply cord angle of a bias-belted tire is within the range of approximately 30° to 40°, it is preferred that the belt cord angle be within the range of approximately 22° to 30°. The cord angle of the belt plies is defined in the same manner as was the cord angle of the carcass plies. In each case where the cord angle of the carcass plies or belt plies is indicated, it will be understood that this angle will be as measured after the tire has been cured, mounted on a suitable rim and inflated to a pressure within its normal operating pressure range.

As in the case of the carcass ply cords, in the specific embodiment shown, the cords of the belt plies are inclined at equal but opposite cord angles. Also, in the specific embodiment shown in the drawing, the radially outer belt ply 22 has a width less than the width of the inner belt ply 20, and the outer belt ply 22 has a width which is approximately equal to the width of the ground-contacting portion of the tread 13 of the tire.

In a preferred construction of a bias-belted tire according to this invention, the cords of the belt plies 20, 22 are constructed of continuous filament fiberglass, as it has been found that the combination of such a fiberglass belt with a polyester cord carcass in a bias-belted tire offers decided advantages. However, this is not to say that it is not within the full scope of the invention to utilize other materials for the belt cords. Such other materials might be polyester, rayon, metal, or any other material or combination of materials which is found to be feasible for use in the manufacture of a reinforcing cord for the belt of a belted tire.

In accordance with one aspect of the present invention and as indicated generally at 24, there is disposed over the belt 18 at least next adjacent the belt edges and between the belt 18 and tread 13 a quantity of discrete, relatively short length filaments embedded in rubber. In a preferred embodiment, and as shown in the drawing, the filaments are randomly oriented and are embedded within, and are an integral part of, a layer of rubber disposed between the belt and the tread, and thus the filaments are in a layerlike configuration. The filaments are distributed generally uniformly throughout the layer of matrix of rubber in which they are embedded. Such distribution is accomplished in a suitable manner such as by introducing the filaments into the rubber as it is passed through a calender or mill to provide a sheet or layer of filamentary reinforced rubber. As such processes are well known in the manufacture of sheets or layers of filamentary reinforced rubber, they need not be described in further detail.

In accordance with another aspect of the present invention, the rubber in which the filaments described above are embedded is a low hysteresis rubber. By low hysteresis rubber is meant, for the purpose of this invention, a rubber which has the characteristic of generating less heat than the rubber of the tread under the same conditions of cyclic loading. The rubber of the tread referred to in the foregoing definition of low hysteresis rubber is that rubber present in what is often referred to as the nonskid portion of the tread. The nonskid portion of the tread is that portion of the tread which is profiled such as by circumferential or laterally extending grooves, slits, slots, etc. or combinations of the same, to provide a three-dimensional pattern of ribs or blocks or combinations thereof in the tread. Disposed inwardly of the nonskid portion of the tread is the portion of the tread often referred to as the undertread. The undertread may be of the same or different material as the nonskid portion of the tread. For example, it is known to provide an undertread, at least portions of which are composed of a rubber having the characteristic of generating less heat than does the rubber forming the nonskid portion of the tread under the same conditions of cyclic loading. It is therefore within the scope of another aspect of the present invention to provide, in a belted tire having an undertread which is in whole or in part formed of rubber different from the rubber in the nonskid portion of the tread, a quantity of filamentary reinforced low hysteresis rubber disposed between the belt and tread and next adjacent the belt edges. Further, where a low hysteresis rubber is used as all or a part of the undertread portion of the tread, the same rubber could conceivably be utilized as the matrix for the filaments. Additionally, it is within the scope of another aspect of this invention that where at least the portions of the undertread next adjacent the belt edges are of low hysteresis rubber, such portions of the undertread may be reinforced with filaments of the type described herein.

The filamentary reinforced rubber is superposed at least substantially directly over the belt. By this is meant that the rubber containing the filaments may be laid directly over and in contact with the outer belt ply 22, although it is within the invention to dispose between the filamentary reinforced rubber and the belt a relatively thin layer of rubber which does not contain any filaments. In a preferred embodiment the filaments are short lengths of brass-plated steel wire having a diameter of approximately 0.006 inch and a length of between three-eighths inch and five-eighths inch and preferably approximately one-half inch. The filaments are randomly oriented in the sense that the filamentary reinforced rubber does not exhibit any substantially greater modulus of elasticity or resistance to elongation in any one direction within the general plan thereof than in any other direction within the general plane thereof.

While steel wire is preferred as a filamentary reinforcement, it is within the scope of this invention to utilize other filamentary materials such as of nylon, polyester, rayon, or other suitable textile materials or filaments of glass, or any other material or combination of materials the use of which is found to be feasible for the purpose intended.

The filamentary material may be present in an amount of from 1 to 40 percent by total weight of rubber and filaments in the composite of filaments and rubber. Where the filamentary material is wire it is preferred that the concentration be no greater than about 12 percent, and it is believed that a lesser concentration will afford satisfactory results. It is preferred that where the filaments are in layer form that the thickness of the layer not exceed approximately 0.150 inch, and it has been found that satisfactory results are to be obtained in a bias-belted tire for passenger vehicles where a layer of filaments is no greater than about 0.060 inch in thickness.

In a preferred embodiment utilizing a filamentary layer, the layer has a width which is at least as great as the width of the belt 18. By the width of the belt 18 is meant the overall width of the belt assembly regardless of the width of any one of the belt plies. For example, in the specific embodiment shown in the drawing, the width of the belt would be determined by the width of the wider inner belt ply 20. In order to provide improved protection against belt edge separation within the tire, particularly at high speeds, it is further preferred that the filamentary reinforced rubber extend from inside to outside the outer edges 26, 28 of the belt 20. Where the filamentary reinforced rubber is in the form of a layer extending entirely across the belt, this desired result can easily be achieved by providing the layer with a width greater than that of the belt.

Bias-belted tires constructed in accordance with the present invention have exhibited substantially improved performance over a tire similarly constructed but not containing a filamentary reinforced rubber between the belt and the tread. For example, in a specific test comparison, two tire constructions of J78–15 size were utilized. Both constructions had two-ply polyester cord reinforced carcasses with the carcass cord angle being approximately 33.5°. Both tires further had a two-ply fiberglass cord reinforced belt having a cord angle of approximately 25°. In one only of such tires, there was disposed between the belt and tread a layer of wire filament reinforced low hysteresis rubber. The filaments were randomly oriented and were in a concentration of approximately 12 percent by total weight of the filaments and rubber in which the filaments were embedded. The filaments had a diameter of approximately 0.006 inch and a length of approximately one-half inch. The filamentary reinforced layer was approximately 0.060 inch in thickness and extended over the entire belt and beyond the edges thereof approximately one-half inch. The filament reinforced layer was laid directly over and in contact with the belt.

These two constructions were tested at varying speeds upward from 75 m.p.h. on a conventional test wheel under prescribed inflation and load conditions and in a manner intended to induce early failure in the tire being tested. While the control tire without the filamentary layer completed satisfactory mileage before failure was induced by separation in the area of the belt edges, the tire having the filamentary layer completed approximately 15 percent more mileage before failure and there did not appear to be any significant separation at the belt edges. Also, and quite importantly, at a predetermined point in the testing normally considered to indicate a satisfactory level of performance, the temperature in the shoulder region of the tire having the filamentary layer was approximately 10 percent lower than the temperature of the corresponding region in the control tire.

Based on the above-described testing it is to be expected that tires constructed in accordance with this invention will have substantially lower overall operating temperatures in the tread region and particularly in the shoulder region of the tire. This cooler running will tend to provide greater strength and durability in the tread and belt regions of the tire, and will tend to contribute to improvement in resistance to belt edge separation within the tire. Additionally, the filaments will, it is believed, tend to mechanically reduce the tendency for belt edge separation. Where the filaments are metal, it is further believed that the filaments tend to make the operating temperature in the tread region more uniform and to provide a reduction in temperature in the shoulder area of the tire, inasmuch as it is believed that these metal filaments tend to dissipate the heat in a more uniform and efficient manner than will the rubber in the tire.

Additionally, filamentary reinforcement provides protection against cuts and penetration by foreign objects as well as providing improved resistance to cut growth. The filamentary reinforcement will also tend to stiffen the tread region of the tire thus tends to provide an improvement in the wearing quality of the tread. Accordingly, it will be seen, for example, that a bias-belted passenger vehicle tire constructed in accordance with the present invention will provide substantially improved performance over previous bias-belted tires.

While certain representative embodiments and details have been shown for the purpose of illustrating the invention, it will be apparent to those skilled in this art that the various changes and modifications disclosed above as well as others may be made therein without departing from the invention. For example, where the term cord is used herein it will be understood that the term is being used in a general sense to indicate not only a twisted or cabled construction but also any reinforcing member, whether it be in the form of a ribbon, plait, bundle of untwisted filaments or of any other suitable construction.

What I claim is:

1. A bias-belted pneumatic tire comprising a bias-ply carcass having spaced-apart beads, a tread disposed over and extending circumferentially about the carcass, and a belt of tire cord fabric disposed over and extending circumferentially of the tire carcass and located between the carcass and the tread, and a quantity of randomly oriented filaments embedded in rubber and disposed beneath the tread and over the belt at least adjacent the edges thereof.

2. A bias-belted pneumatic tire as claimed in claim 1, in which said filaments are in layer form, said layer having a width at least as great as that of the belt but terminating substantially short of said beads.

3. A bias-belted pneumatic tire as claimed in claim 1, in which said carcass comprises a plurality of continuous filament polyester cord reinforced plies and said belt comprises a plurality of fiberglass cord reinforced plies.

4. A bias-belted pneumatic tire as claimed in claim 1, in which said filaments are embedded in low hysteresis rubber.

5. A bias-belted pneumatic tire as claimed in claim 1, in which said filaments are present in the composite provided by said rubber and filaments in an amount of from 1 percent to 40 percent by total weight of the composite.

6. A bias-belted pneumatic tire as claimed in claim 2, in which said layer is superposed at least substantially directly over said belt and extends beyond the edges of the belt.

7. A bias-belted pneumatic tire as claimed in claim 1, in which said filaments are of synthetic material.

8. A bias-belted pneumatic tire as claimed in claim 1, in which said filaments are fiberglass.

9. A bias-belted pneumatic tire as claimed in claim 1, in which said filaments are metallic wire.

10. A bias-belted pneumatic tire as claimed in claim 9, in which said filaments are approximately 0.006 inch in diameter and three-eighths inch to five-eighths inch long.

11. A bias-belted pneumatic tire as claimed in claim 2, in which the thickness of said layer is no greater than about 0.150 inch.

12. A bias-belted pneumatic tire as claimed in claim 2, for use on a passenger vehicle, in which the thickness of said layer is no greater than about 0.060 inch.

13. A bias-belted pneumatic tire as claimed in claim 12, in which said filaments are wire and are present in said tire in an amount of no greater than about 12 percent by total weight of the filaments and the rubber in which the filaments are embedded, said filaments being approximately three-eighths inch to five-eighths inch in length.

14. A bias-belted pneumatic tire as claimed in claim 13, in which said layer of filaments has a thickness of no greater than 0.150 inch and extends beyond the edges of said belt, said layer being superposed at least substantially directly over said belt.

15. A pneumatic tire comprising a carcass having spaced-apart beads, a tread disposed over and extending circumferentially about the carcass, a belt of the tire cord fabric disposed over and extending circumferentially about the carcass and located between the carcass and the tread, and low hysteresis rubber disposed between the belt and the tread, said rubber being reinforced with a multiplicity of filaments and being disposed over the belt at least next adjacent the edges thereof.

16. A pneumatic tire as claimed in claim 15, in which said filaments are randomly oriented.

17. A pneumatic tire as claimed in claim 15, in which said rubber is in the form of a layer disposed over the belt and having a width at least as great as that of the belt.

18. A pneumatic tire as claimed in claim 16, in which the filamentary-reinforced low hysteresis rubber is superposed at least substantially directly over the belt and extends the full width of the belt and beyond the edges of the belt.

19. A pneumatic tire as claimed in claim 18, in which said filaments are randomly oriented.

20. A pneumatic tire as claimed in claim 15, in which said carcass is a bias-ply carcass and said filaments are randomly oriented.

21. A pneumatic tire as claimed in claim 20, in which said carcass comprises a plurality of polyester reinforced cord plies and said belt comprises a plurality of fiberglass cord reinforced plies.

22. A pneumatic tire as claimed in claim 21, in which said filaments are metallic wire each having length of between three-eighths inch and five-eighths inch, said layer of low hysteresis rubber being a thickness of no greater than about 0.150 inch.

23. A pneumatic tire as claimed in claim 17, for use on a passenger vehicle, in which the thickness of said layer is no greater than about 0.060 inch.

24. A pneumatic tire as claimed in claim 23, in which said filaments are randomly oriented and said carcass is a bias-ply carcass.

25. A pneumatic tire as claimed in claim 24, in which said carcass comprises a plurality of polyester reinforced cord plies and said belt comprises a plurality of fiberglass cord reinforced plies, said filaments in said layer being randomly oriented wire filaments.

26. A pneumatic tire comprising a carcass having spaced-apart beads, a tread disposed over and extending circumferentially about the carcass, said tread having a nonskid portion and an undertread portion, and a belt disposed over and extending circumferentially about the carcass and located between the carcass and the tread, at least the portion of said undertread disposed adjacent the edges of the belt being of low hysteresis rubber reinforced with a multiplicity of discrete filaments.

27. A pneumatic tire as claimed in claim 26, in which said filaments are randomly oriented.

28. A pneumatic tire as claimed in claim 27, in which said filaments are metallic wire.